Dec. 27, 1966  A. M. NEIMARK ETAL  3,293,701
AUTOMATON FOR MANUFACTURING SHELL HALF-MOLDS FROM
SAND AND RESIN COMPOSITIONS
Filed July 22, 1963  5 Sheets-Sheet 5

United States Patent Office 3,293,701
Patented Dec. 27, 1966

3,293,701
AUTOMATON FOR MANUFACTURING SHELL HALF-MOLDS FROM SAND AND RESIN COMPOSITIONS
Afraim Markovich Neimark, Alexandr Mikhailovich Derbasov, Vitaly Sergeevich Zakalinsky, Victor Leonidovich Levitan, Jury Vladimirovich Kamensky, and Victor Maximovich Korolev, all of Moscow, U.S.S.R., assignors to Vsesojuzny Nauchno-Issledovatelsky i Proektno-Tekhnologichesky Institute Ugolnogo Mashinostroenija
Filed July 22, 1963, Ser. No. 296,735
4 Claims. (Cl. 22—20)

The present invention relates to highly accurate casting apparatus and more particularly to an automatically operable apparatus for producing shell half molds from a dry molding mixture, namely, sand, and a hardenable thermosetting resin.

Automatic and other types of apparatus are known for manufacturing shells by free falling sand and a resin into an opened pattern from a rotating hopper or the like containing the molding mixture. The known types of automatic apparatus employ molding mixtures or compositions having a high content of an expensive thermosetting resin and such apparatus encounters technological problems in the shaping of large shell half molds and molds of complex configuration. The above has delayed considerably the introduction of highly accurate casting which in many cases was economically inexpedient.

Attempts have heretofore been made to overcome these difficulties and improve molding by the use of rubber or elastic chambers for ramming the molding mixture around the pattern in such machines. However, this technique did not overcome the above-mentioned difficulties but rather created new problems from the technological viewpoint due to a more complex molding process. Moreover, these difficulties have not been solved by the employment of machines provided with inflatable or pressure heads.

The present invention is directed to an apparatus for successfully solving these problems which is based on the concept of a molding technique substantially different from the known procedures for shell molding.

The present invention allows the manufacture of such shells from a composition having a lower content of an expensive thermosetting resin thereby obtaining castings having a cleaner surface, thus augmenting not only mass production but serial and small scale production.

An object of the invention is to provide an automatic machine affording castings and shells of higher quality and enabling the manufacture of the same from mixtures having a lower content of thermosetting resin for reducing the cost of the products and at the same time eliminating those disadvantages characteristic of the known machines for producing such products.

Another object of the invention is to provide means for increasing the efficiency and for ensuring the automatic production of large shell molds and shells of complex configuration provided with internal cavities.

Further objects and advantages of the invention will become more readily apparent from the ensuing detailed description and annexed drawings, in which drawings.

Figure 1:
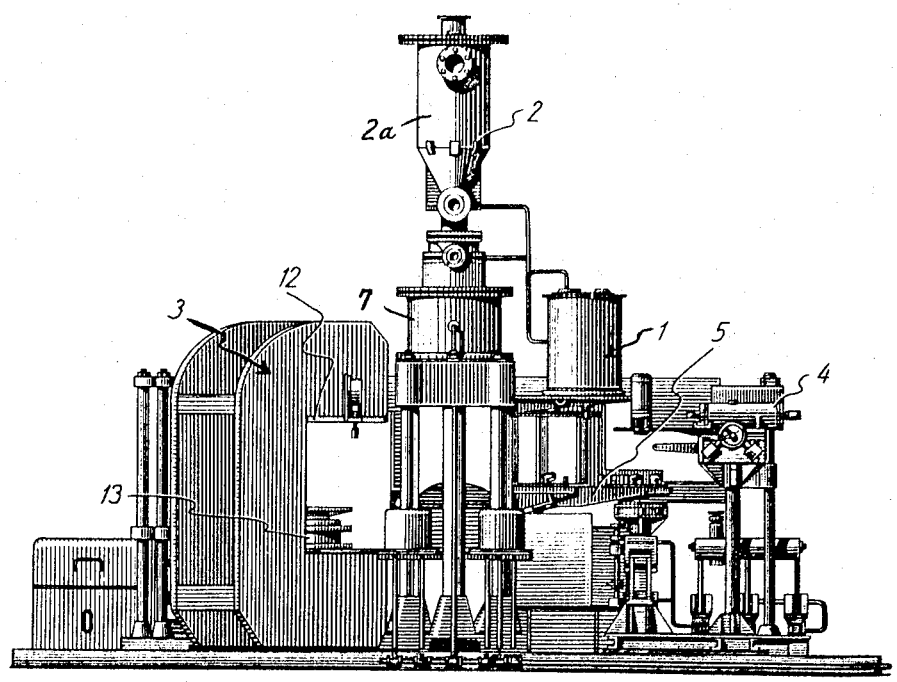
FIGURE 1 is an elevational view of the automatic machine of the present invention.
Figure 2:
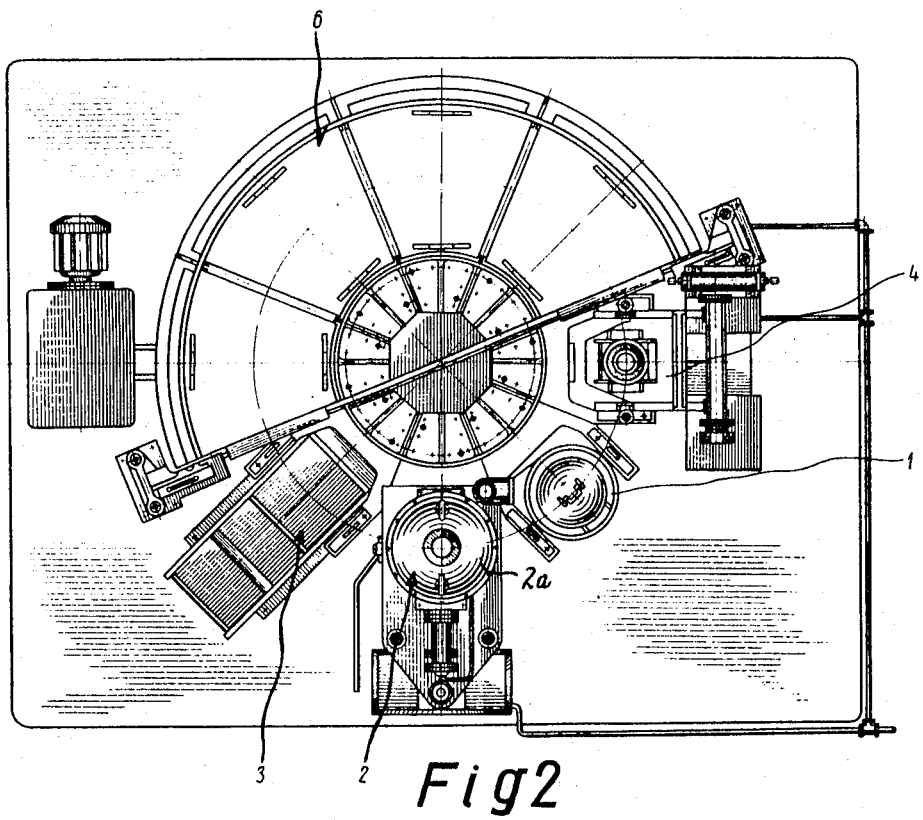
FIGURE 2 is a plan view partly in section of the apparatus shown in FIGURE 1.

The automatic apparatus incudes a plurality of independent components each of which serves to accomplish a particular complete operation in the shell manufacturing process and generally, as shown in FIGURE 2, includes means 1 for blasting and coating the pattern with a separating or stripping material of known type; means 2 for ramming or compacting the molding mixture about the pattern; means 3 for the final shaping of an unsolidified shell; a rotatable base 5 provided with pattern plates adapted to have stepwise movement imparted thereto; a furnace or oven for baking the shell; and means 4 for removing and feeding the shell.

Figure 3:
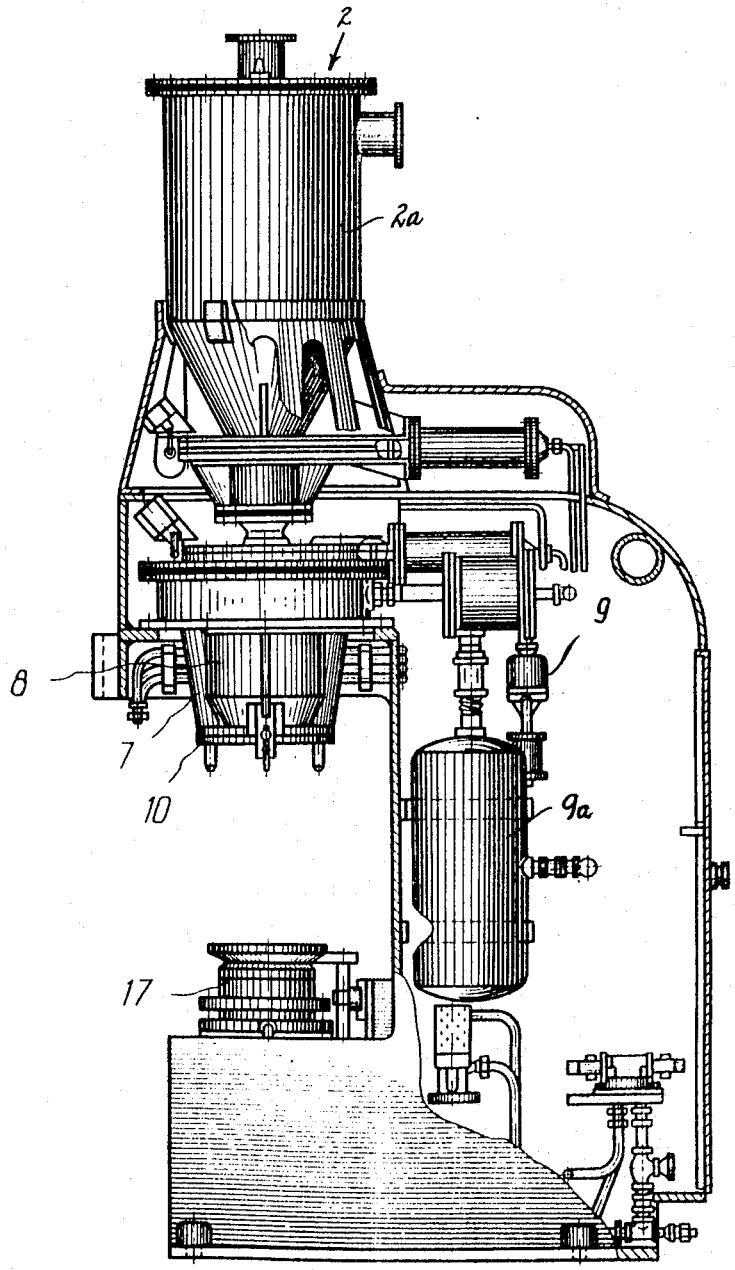
FIGURE 3 is an elevational view partly in cross section and partly broken away on an enlarged scale of the molding mixture distributing means.

The means 2, as shown in FIGURE 3, includes a hopper 2a adapted to contain a molding mixture such as sand, and a thermosetting resin or other binder, and the hopper 2a communicates at its lower end with a head 7 provided with a concentrically arranged tube 8 to which the molding mixture is supplied. A control valve 9 is provided in a compressed air conduit leading from a suitable source of air such as shown at 9a and which leads to the head 7 for blowing the mixture leaving the tube 8 through a plate 10 provided at the bottom of the head (FIGURE 3) and which plate is provided with stepped channels 11.

The means 3 for use in the final shaping of the shell prior to passage through the oven 6 includes a bed plate 12 and a vertical fluid piston-cylinder assembly 13 is mounted on the plate 12. A pressure plate 16 is operably connected with the piston of the fluid cylinder and serves for supporting the lower mold which houses the pattern after the pattern leaves the means 2. The bed plate 12 also supports an upper plate 14 spaced above the pressure plate 16 and to which upper plate an upper mold can be attached by the releasable attaching means 15 shown in FIGURE 7. In other words, the upper and lower molds ensure the desired final dimensions of the shell.

Figures 6, 7:
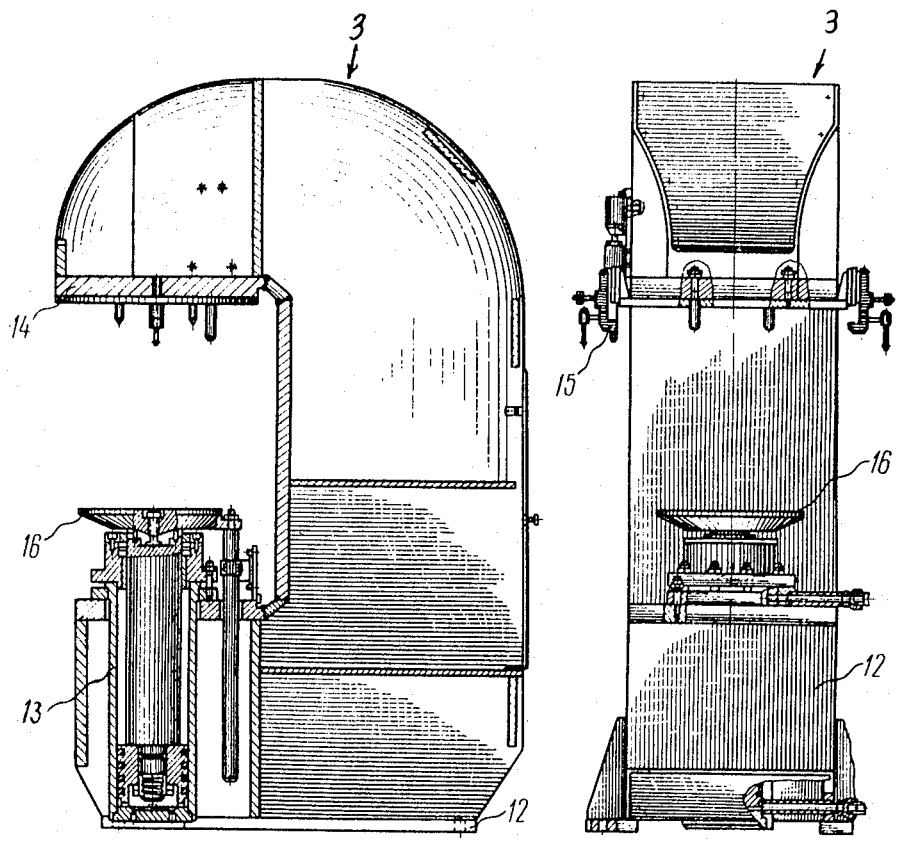
FIGURE 6 is an elevational view partly in cross section of the mold shaping means for an unsolidified shell.
FIGURE 7 is a front elevational view of the mold shaping means shown in FIGURE 6.

After a predetermined time period a relay (not shown) initiates a signal to effect lowering of the piston of the piston-cylinder assembly 13 whereupon the molded shell will be lowered to the position shown in FIGURE 6 with the lower mold.

Figure 8:
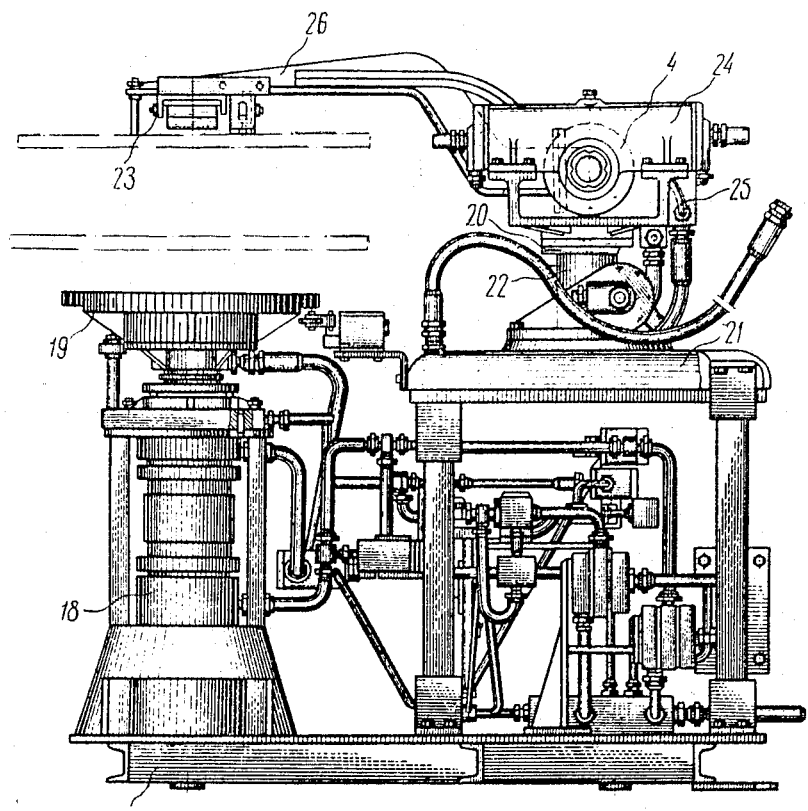
FIGURE 8 is an elevational view of the means for removing and feeding shells.
Figure 4:
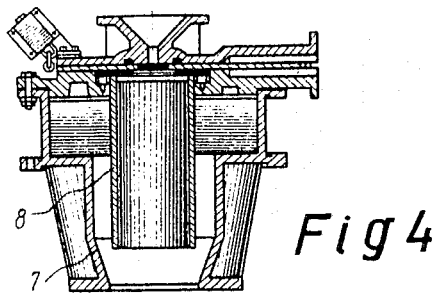
FIGURE 4 is a vertical sectional view of the components of the mixture distributing means.
Figure 5:
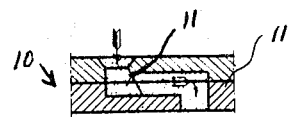
FIGURE 5 is a fragmentary view in vertical section of the plate component of the mixture distributing means.

The thus formed mold then moves through the oven 6 for the requisite baking operation and is thereafter removed by the means 4. The means for removing includes, as shown in FIGURES 2 and 8, a fluid piston and cylinder assembly 18 mounted on a base 17 and the rod of the piston is provided with a ring 19 which functions to remove the lower mold and shell from the pattern plate. More specifically it will be noted that a rotatable assembly 20 is mounted on a support base 21 and a fluid piston-cylinder assembly 22 is operably associated therewith for imparting horizontal rotary movement to levers 26 provide with suction operated gripping means 23. The assemblage further includes a hydraulic cylinder mounted on an arm 25 and the cylinder includes a rack feed gear (not shown) which functions to turn the levers 26 vertically through 180°.

After leaving the oven 6 the lower mold with the solidified shell is positioned opposite the piston-cylinder assembly 18 and upon upward movement of the piston the ring 19 removes the mold from the pattern and when the same is moved into operative relation to the grips 23, the grips are actuated to hold the same thereto whereupon upon downward movement of the piston the ring moves in the same direction with the lower mold and the grips 23 hold the shell. The levers 26 can then be swung horizontally to the desired location for the thus molded shell after which the grips 23 are inactivated thus releasing such shell.

Of course the above cycle is repeated for each operation.

From the above description it is believed clear that the base 5 with the pattern plates is indexed by suitable means and initially the pattern is coated with a suitable separating material at the means 1 after which it is moved beneath the hopper 2 at which time the requisite amount of molding material is introduced. Thereafter the pattern moves to the means 3 whereupon the plate 16 supporting the lower mold and pattern is moved into engagement with the upper mold associated with the plate 14 for imparting the final dimensions to the shell and upon downward movement of the plate 16 the thus pressed shell and mold are lowered for movement into the oven and during travel therethrough the shell is baked to the requisite degree. After leaving the oven the means 4 is activated so that the grips 23 remove the shell from the pattern and thereafter moves the final shell to a point of deposit.

The invention is not to be confined to any strict conformity to the showing in the drawing but changes or modifications may be made therein so long as such changes or modifications mark no material departure from the spirit and scope of the appended claims.

What we claim is:

1. An automatic machine for making shell half molds from a dry molding mixture of sand and a hardenable thermosetting resin, comprising a base adapted to have intermittent movement imparted thereto, a plurality of spaced arms carried by the base with each arm supporting a pattern upon which the molding mixture is adapted to be deposited to provide the shell half mold, means for applying a separating liquid to each pattern, a preshaping station located in the path of movement of the arms including a hopper located above the arms and containing the molding mixture, a head carried by the hopper for depositing the mixture on the pattern, means for raising a pattern from the arm when the arm is located below the hopper into operative relationship respecting the head, conduit means within the head through which the mixture can pass, means for introducing compressed air into the head for compacting the mixture about the pattern, and means for lowering the pattern to the arm after the mixture has been compacted thereabout, a final shaping station located in the path of movement of the arms to which the pre-shaped pattern is moved after leaving the preliminary station, said final pre-shaping station including a lower mold part for the pre-shaped pattern, an upper mold part, and a fluid piston and cylinder means for moving the lower mold part and pre-shaped pattern upwardly into operative relationship to the upper mold part for imparting the desired shape to the unsolidified shell and for moving the lower mold part and pattern away from the upper mold part to the arm, an oven in the path of movement of said arms through which the thus shaped shell and pattern pass for baking the same, and means in the path of movement of the arm operative to remove the baked shell from the pattern after the same leaves the oven.

2. The automatic machine as claimed in claim 1, including valve means for controlling compressed air flow to said head and a closure plate for said head provided with stepped channels therein.

3. The automatic machine as claimed in claim 1, including a support plate for said upper mold part and means for detachably securing the upper mold part to said support plate whereby mold parts of varying configuration may be employed.

4. The automatic machine as claimed in claim 1, in which said removing means includes a lever rotatable horizontally and vertically relative to the shell, gripping means on the lever adapted to grip the baked shell and remove the same from the pattern upon relative movement between the lever and pattern, and fluid pressure means operably connected with said lever for rotating the same horizontally and vertically.

References Cited by the Examiner

UNITED STATES PATENTS

| | | | |
|---|---|---|---|
| 1,503,122 | 7/1924 | Frank | 22—25 |
| 2,692,409 | 10/1954 | Herbruggen | 22—36 |
| 2,695,431 | 11/1954 | Davis | 22—21 |
| 2,755,526 | 7/1956 | Jenkins et al. | 22—21 |
| 2,762,092 | 9/1956 | Klamp et al. | 22—21 |
| 2,852,818 | 9/1958 | Shallenberger et al. | 22—36 |
| 2,973,562 | 3/1961 | Miller | 22—36 |
| 3,181,207 | 5/1965 | Schaible et al. | 22—20 |

J. SPENCER OVERHOLSER, *Primary Examiner.*

ROBERT F. WHITE, *Examiner.*

R. D. BALDWIN, *Assistant Examiner.*